United States Patent [19]
Rahn et al.

[11] Patent Number: 5,100,084
[45] Date of Patent: Mar. 31, 1992

[54] METHOD AND APPARATUS FOR INCLINED ORBIT ATTITUDE CONTROL FOR MOMENTUM BIAS SPACECRAFT

[75] Inventors: Christopher D. Rahn, Pleasant Hill; John A. Lehner, Sunnyvale; Donald W. Gamble, Menlo Park, all of Calif.

[73] Assignee: Space Systems/Loral, Inc., Palo Alto, Calif.

[21] Appl. No.: 579,117

[22] Filed: Sep. 7, 1990

Related U.S. Application Data

[63] Continuation-in-part of Ser. No. 510,321, Apr. 16, 1990, abandoned.

[51] Int. Cl.$^5$ .............................................. B64G 1/28
[52] U.S. Cl. .................................. 244/165; 342/355; 364/459
[58] Field of Search .............................. 244/164–171, 244/158 R; 342/352–358; 364/434, 459

[56] References Cited

U.S. PATENT DOCUMENTS

| | | | |
|---|---|---|---|
| 3,088,697 | 5/1963 | Cutler | 342/355 |
| 3,171,612 | 3/1965 | Hildebrant | 342/355 |
| 3,747,095 | 7/1973 | Wilson | 342/355 |
| 4,084,722 | 4/1978 | Muhlfelder . | |
| 4,106,094 | 8/1978 | Land . | |
| 4,188,666 | 2/1980 | Legrand et al. . | |
| 4,294,420 | 10/1981 | Broquet . | |
| 4,521,855 | 6/1985 | Lehner et al. . | |
| 4,630,058 | 12/1986 | Brown | 342/356 |
| 4,757,964 | 7/1988 | McIntyre . | |
| 4,776,540 | 10/1988 | Westerlund | 342/355 |
| 4,911,385 | 3/1990 | Agrawal et al. | 244/164 |

OTHER PUBLICATIONS

Terasaki, R. M., "Dual Reaction Wheel Control of Spacecraft Pointing," Symposium on Attitude Stabilization and Control of Dual Spin Spacecraft, El Segundo, Calif., pp. 185–196 (Aug. 1967).

Dahl, P. R., "A Twin Wheel Momentum Bias/Reaction Jet Spacecraft Control System," AIAA Paper No. 71-951, AIAA Guidance, Control and Flight Mechanics Conference, Hofstra University, Hempstead, New York, (Aug. 1971).

Lebsock, K. L., "Magnetic Desaturation of a Momentum Bias System," *AIAA Journal of Guidance and Control*, 6 (No. 6), pp. 477–483, 1983.

Dougherty, H. J., et al., "Analysis and Design of WHECON—An Attitude Control Concept," AIAA paper 68-461, AIAA 2n Communications Satellite Systems Conference, pp. 1–10, (Apr. 1968).

Wie, B., et al., "Roll/Yaw Control of a Flexible Spacecraft Using Skewed Bias Momentum Wheels," 8 (No. 4), pp. 447–453, (Jul.–Aug. 1985).

Hepden, C. R., "An on–board digital processor for three axis attitude control," Journal of the British Interplanetary Society, vol. 27, No. 8, pp. 580–589, Aug. 1974.

*Primary Examiner*—Galen Barefoot
*Attorney, Agent, or Firm*—Townsend and Townsend

[57] ABSTRACT

The present invention is a method and apparatus to control a pointing trajectory of an aim point with respect to one or more targets for a momentum bias spacecraft in an orbit inclined relative to an equatorial geosynchronous orbit wherein the spacecraft is provided with an onboard computer capable of using orbit information available to the spacecraft and spacecraft hardware to move the aim point according to a predetermined tracking model which may be either time-varying or invariant. The tracking model allows the controller to remove short-term nutational and long-term orbit rate dynamical disturbances, beyond simple-order sinusoidal functions having a single frequency.

5 Claims, 4 Drawing Sheets

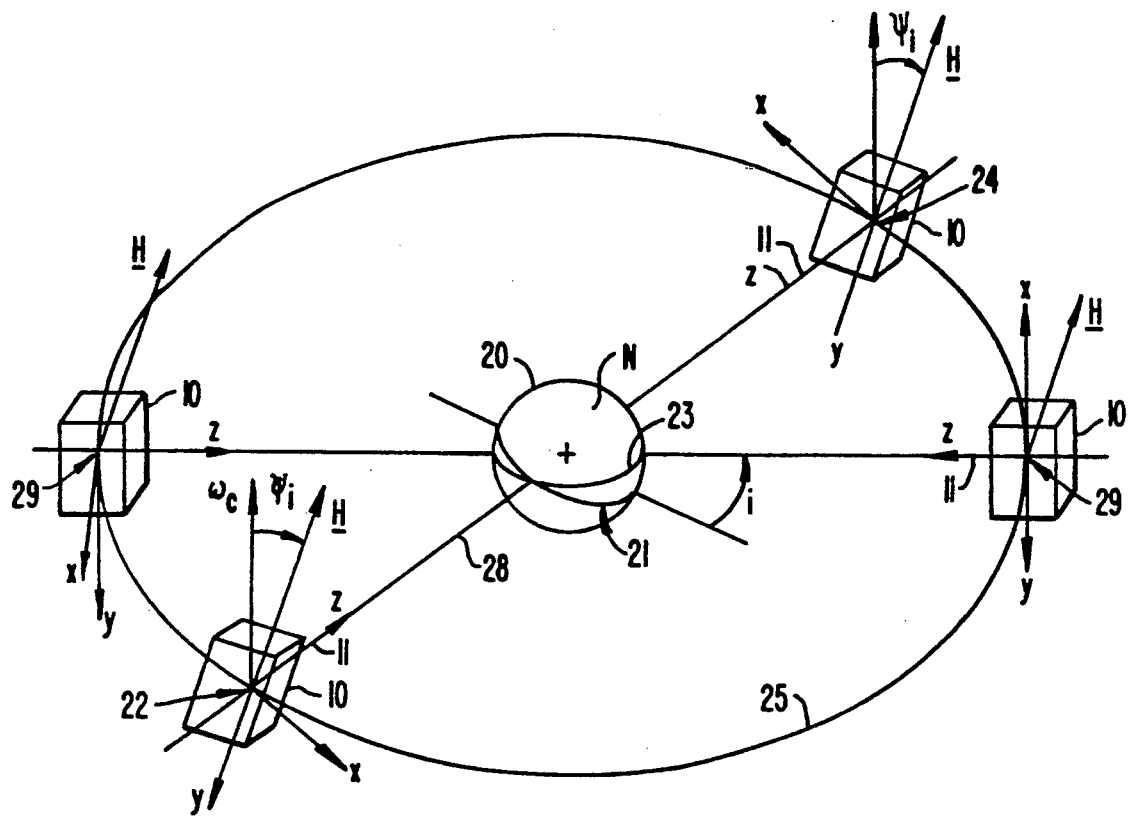
FIG._1.
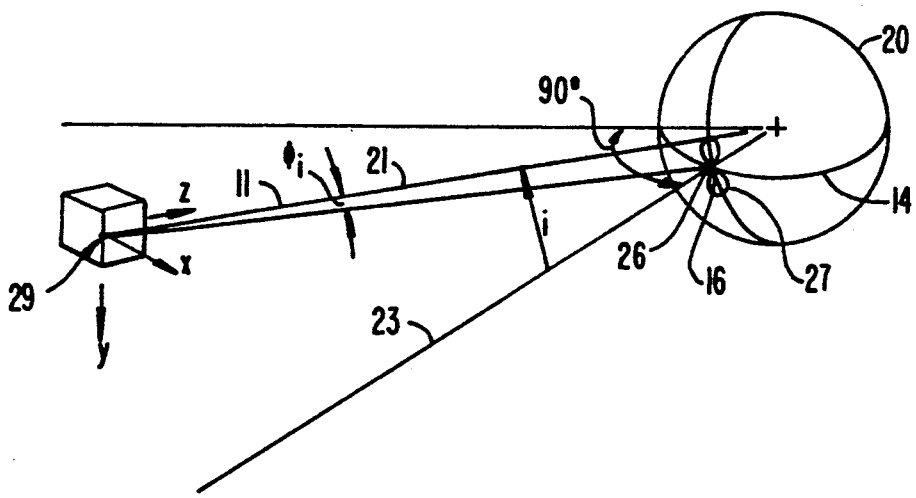
FIG._2.

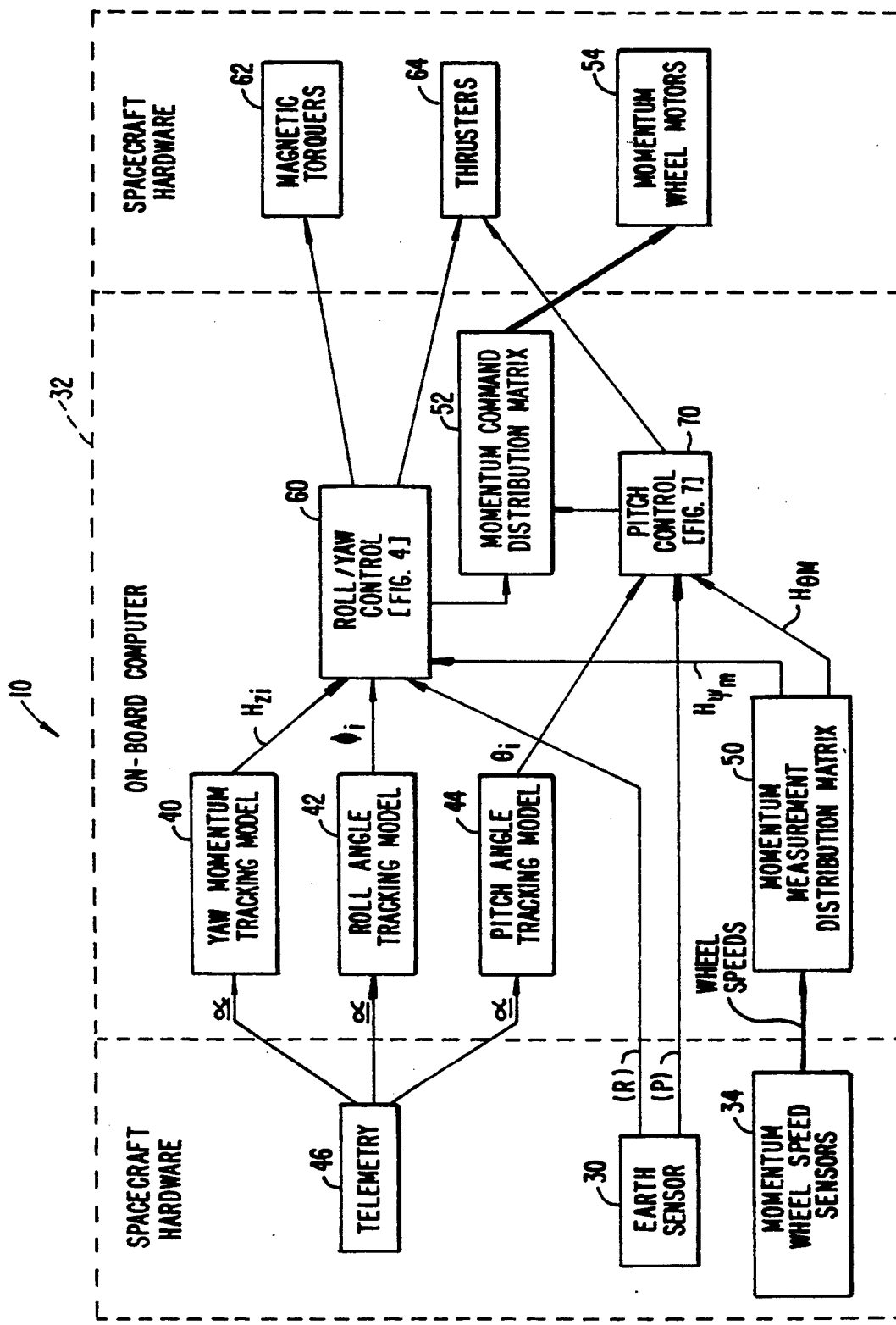
FIG._3.

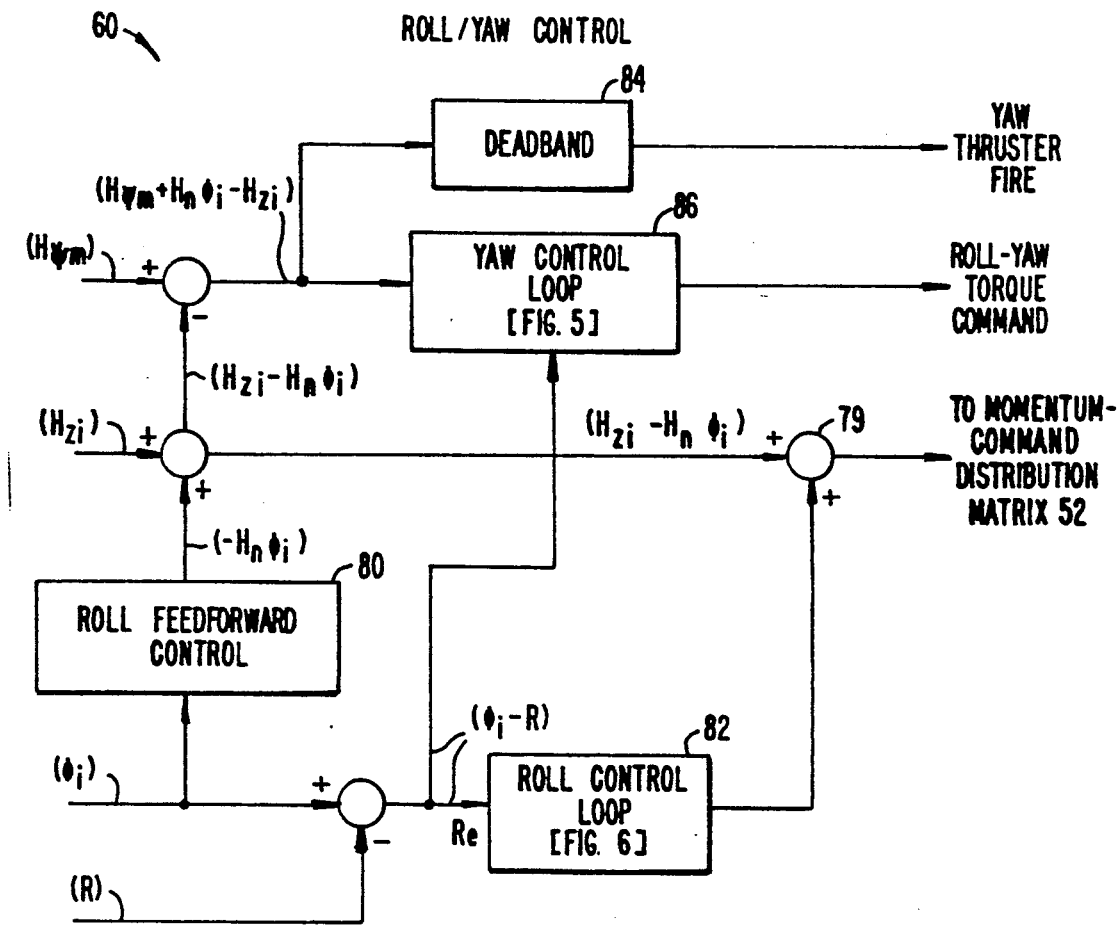
FIG._4.
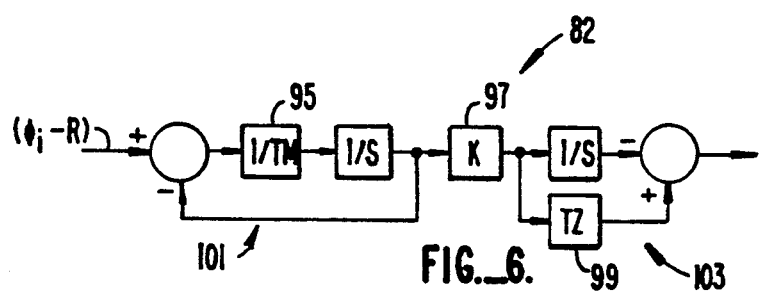
FIG._6.
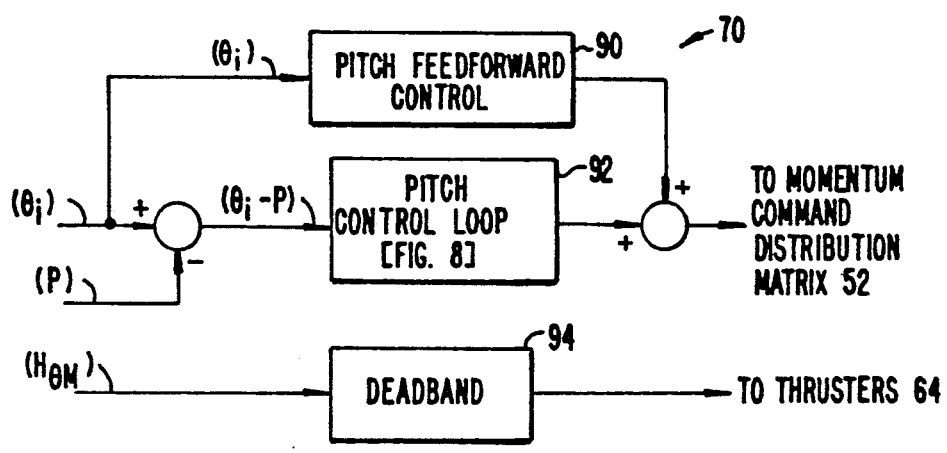
FIG._7.

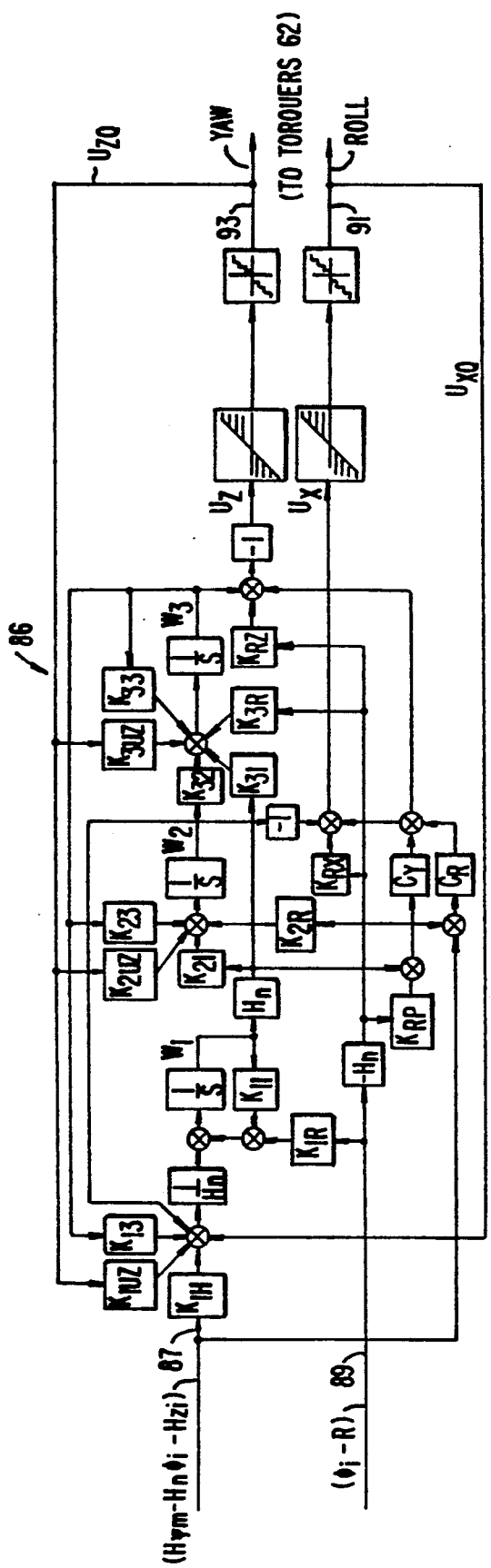
FIG._5.
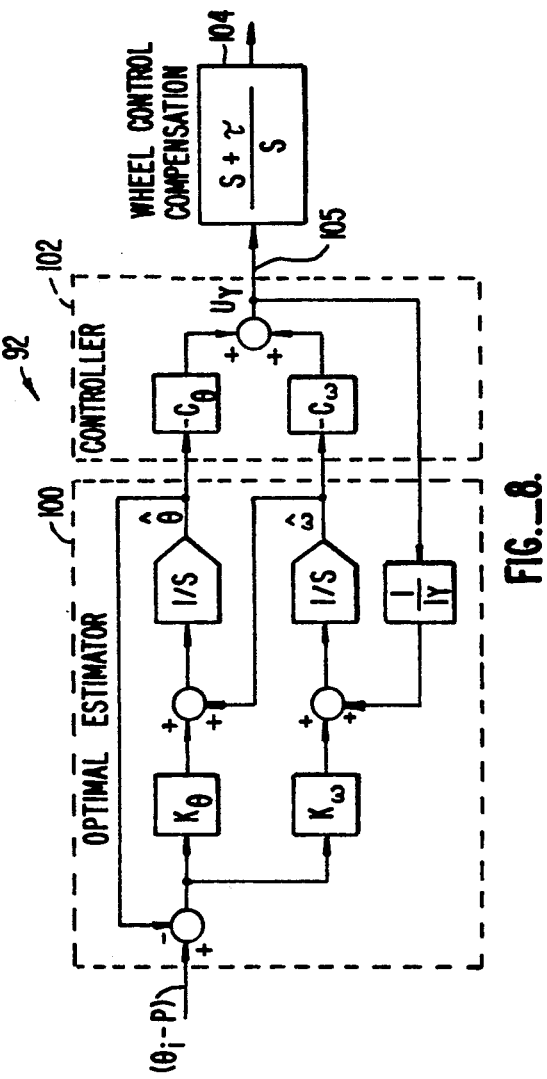
FIG._8.

METHOD AND APPARATUS FOR INCLINED ORBIT ATTITUDE CONTROL FOR MOMENTUM BIAS SPACECRAFT

This is a continuation-in-part application of U.S. Ser. No. 07/510,321 filed Apr. 16, 1990, now abandoned.

BACKGROUND OF THE INVENTION

This invention relates to a method and apparatus for attitude control of a spacecraft in orbit. It is known to provide attitude control for spacecraft in a geosynchronous equatorial plane orbit to correct for roll and yaw errors. For communication satellites, maintenance of a geosynchronous equatorial orbit greatly simplifies attitude control to obtain necessary pointing accuracy for the spacecraft.

Maintenance of this equatorial orbit necessarily expends considerable propellant as spacecraft in equatorial orbit are subject to various destabilizing forces. These destabilizing forces include gravitational effects from the sun and moon which alter orientation of the geosynchronous orbit from an equatorial orbit with zero inclination, to a slightly inclined orbit. Stationkeeping is a function implemented by the spacecraft to maintain the spacecraft at a particular inclination. As more stationkeeping maneuvers are required, more propellant is used by the spacecraft, resulting in a determinable cost per operational lifetime. As an amount of propellant is increased to provide for extended stationkeeping, this cost necessarily increases. There is a well-recognized trade-off between the amount of propellant needed to fulfil stationkeeping maneuvering over the lifetime of the spacecraft versus its operational life. As more propellant is needed, the more cost is associated with putting the spacecraft into orbit. Similarly, as operational lifetime of the spacecraft is increased, additional propellant is required which again adds to the spacecraft's cost. It is therefore a desire associated with existing spacecraft to extend operational life without significantly increasing cost.

One solution is to operate the spacecraft in its geosynchronous equatorial orbit until propellant is substantially exhausted. Thereafter, the spacecraft enters into an inclined orbit due to the disturbance forces. Generally drift of the inclination of the spacecraft's orbit is at a rate of about 0.8 degrees to about 0.9 degrees annually.

Unfortunately, as inclination of the spacecraft increases, maintenance of a particular desired pointing accuracy becomes increasingly more difficult. This difficulty in maintaining a desired pointing accuracy is further increased by the lack of propellant which necessitated operation of the spacecraft in the inclined orbit.

It is known that at a particular inclination, roll, pitch and yaw errors in spacecraft pointing are introduced. In an equatorial orbit, the spacecraft has an aim point which nominally points to the nadir, which is the equator. As inclination of the spacecraft increases, the aim point is no longer necessarily the equator. The spacecraft pointing traces out a figure eight with respect to a particular desired aim point due to the roll and pitch errors.

Generally, for a 5-degree inclination orbit, north-south excursion of the figure eight is approximately 10 degrees, and east-west excursion is approximately ±0.02 or 0.04 degrees. These excursions are unacceptable deviations for many missions of the spacecraft.

Method and apparatus are known for estimation of yaw and other disturbance torques to permit accurate control of yaw errors in an orbiting satellite. Systems implementing these methods often incorporate orbital dynamics specific to equatorial orbits of geosynchronous spacecraft such that operation of the systems cannot be used accurately in an inclined orbit. The prior art has known the use of momentum bias spacecraft, for example, an L-wheel system configured spacecraft or a V-wheel system. Also known are techniques which have been discussed for control of a geosynchronous spacecraft in an inclined orbit. Systems operable in an inclined orbit attempt to compensate for inclination-induced pointing inaccuracies by introducing a relatively slow periodic sinusoidal disturbance into applicable roll commands. The sinusoid disturbance typically has a period of one day, which in essence causes the pointing of the spacecraft to "nod" at the one-day frequency. Nodding of the spacecraft compensates for so-called gross inclination errors which are generally viewed as the north-south excursions. In many instances, compensation of only these gross errors is insufficient for precise pointing required in, for example, narrow beam communications.

An example of a V-wheel momentum bias spacecraft system was disclosed in U.S. Pat. No. 4,521,855 issued to Lehner et al. hereby expressly incorporated by reference for all purposes. In this V-wheel system, two momentum wheels were oriented with respect to one another and the spacecraft such that a total momentum was established in a pitch-yaw plane. Spacecraft roll and pitch were controlled in a known manner by selective control of each of the wheels of the V-wheel system. A wheel speed which is related to a momentum of each wheel, as well understood, was alternately increased in a first wheel while decreased in a second wheel to effect roll of the spacecraft. To effect pitch, speed of both wheels was increased or decreased simultaneously. Yaw error correction was passively implemented by a quarter-orbit coupling as is known in the art.

As a result of orbital dynamics, typical V-wheel systems manifest a phenomenon wherein the momentum wheels continuously gain greater speed due to external disturbance such that momentum unload is required to maintain control. It is known to use magneto-torquers or thrusters as actuators to implement momentum unloads oriented in a yaw/roll plane.

Equations of motion for momentum bias spacecraft have been derived for small inclined orbits. The derivation of these equations will be described next. Equations of motion of the spacecraft in an inclined orbit were initially formulated as transfer functions for a spacecraft having a single pitch wheel. Roll/yaw and pitch dynamics were decoupled from each other, allowing the dynamics to be addressed individually. Equations of motion for a system with both pitch and yaw momentum storage, particularly for roll/yaw, ignoring products of inertia, are as follows:

$$\begin{bmatrix} \dot\phi \\ \dot\psi \\ \dot H_x \\ \dot H_z \\ \dot h_z \end{bmatrix} = \begin{bmatrix} 0 & \omega_0 & \frac{1}{I_x} & 0 & 0 \\ -\omega_0 & 0 & 0 & \frac{1}{I_z} & 0 \\ c_1 & 0 & 0 & c_2 & \frac{1}{\tau} \\ 0 & 0 & c_3 & 0 & 0 \\ 0 & 0 & 0 & 0 & -\frac{1}{\tau} \end{bmatrix} \begin{bmatrix} \phi \\ \psi \\ H_x \\ H_z \\ h_z \end{bmatrix} + \begin{bmatrix} 0 & 0 & 0 \\ 0 & 0 & 0 \\ 1 & 0 & 0 \\ 0 & 1 & -\frac{1}{\tau} \\ 0 & 0 & \frac{1}{\tau} \end{bmatrix} \begin{bmatrix} M_x \\ M_z \\ h_{zc} \end{bmatrix} \quad (1)$$

where:

$$c_1 = -3\omega_0^2(I_y - I_z) \quad (2)$$

$$c_2 = -\frac{1}{I_z}(H_n + (I_y - I_z)\omega_0) \quad (3)$$

$$c_3 = \frac{1}{I_x}(H_n + (I_x - I_y)\omega_0) \quad (4)$$

where $\phi$ and $\psi$ are spacecraft roll and yaw angles; $H_x$ and $H_z$ are body axis roll and yaw angular momentum components; $h_z$ is a total yaw momentum stored in all of the wheels; $h_{zc}$ is a commanded wheel yaw momentum; $I_x$, $I_y$, and $I_z$ are principal moments of inertia about roll, pitch, and yaw axes, respectively; $\omega_0 > 0$ and denominated as an orbital rate for the system $H_n > 0$, and is denominated the momentum bias; $\tau$ is a time constant of momentum wheels; and $M_x$ and $M_z$ are body axis torques. Equation 1 is applicable for all wheel configurations in which there is no roll momentum storage.

In order to eliminate roll ground track errors, a spacecraft must track a desired roll trajectory. The yaw momentum storing wheels are controlled to minimize nutation and allow for roll tracking. Momentum wheels are unloaded by external torque actuators. With an assumption that nutation dynamics are damped by a wheel controller, Equation 1 is simplified to:

$$\begin{bmatrix} \dot H_x \\ \dot H_z \end{bmatrix} = \begin{bmatrix} 0 & \omega_0 \\ -\omega_0 & 0 \end{bmatrix} \begin{bmatrix} H_x \\ H_z \end{bmatrix} + \begin{bmatrix} 1 & 0 \\ 0 & 1 \end{bmatrix} \begin{bmatrix} M_x \\ M_z \end{bmatrix} \quad (5)$$

As nutation frequencies of most spacecraft are greater than typical orbit rates, Equation 5 accurately represents an orbit rate transient response and a low frequency disturbance response of a spacecraft attitude. The angular momentum of a spacecraft is related to attitude errors and wheel yaw momentum as follows:

$$H_z = h_z - H_n\phi \quad (6)$$

and $$H_x = H_n\psi \quad (7)$$

The spacecraft is erected with a momentum perpendicular to an equatorial plane instead of to an inclined orbital plane to passively provide a desired yaw angle for the spacecraft. To obtain a momentum perpendicular to the equatorial plane, a wheel spin-up maneuver is performed at an antinode. Under thruster control, momentum wheels are "spun-up" to different speeds to generate a desired yaw momentum $H_{zi}$, which places a total system momentum (no yaw error) perpendicular to an equatorial orbit plane. A quarter of an orbit later, at a line of nodes $H_{zi}$ transforms to yaw angle $\psi$ as demonstrated by Equation 5. This transformation of $H_{zi}$ to yaw angle $\psi$ allows for passive generation of a desired yaw angle $\psi_i$. Thrusters, or magnetic torquers, regulate a system momentum about this momentum configuration. Alternate methods of wheel spin-up are possible with yaw sensing.

A yaw momentum required to generate $\psi_i$ is as follows:

$$H_{zi} = -i(t)H_n \sin(\omega_0 t + \kappa(t)) \quad (8)$$

resulting in $$\psi_i = i(t) \cos(\omega_0 t + \kappa(t)) \quad (9)$$

the desired yaw angle. Here, $i(t)$ and $\kappa(t)$ are a time varying inclination and time varying position of an ascending node, respectively. An object of a control system of the present invention is to force an actual yaw momentum $\psi_i$ of a spacecraft to track $H_{zi}$.

As indicated above, pitch dynamics are decoupled from roll/yaw dynamics and are expressed in the following form:

$$I_y\ddot\theta = M_y - \frac{1}{\tau}(h_{yc} - h_y) \quad (10)$$

$$\dot h_y = \frac{1}{\tau}(h_{yc} - h_y) \quad (11)$$

where $\theta$ is pitch angle and $M_y$ is an externally applied pitch axis torque, $h_y$ is an equivalent wheel pitch momentum, and $h_{yc}$ is a commanded pitch momentum.

There are three objectives of this control system:

1. To provide for yaw angle tracking by controlling a total yaw momentum of a spacecraft $H_{zi}$. Total yaw momentum of the spacecraft is controlled through use of external torque actuators such as magnetic torquers or thrusters.

2. To provide for roll angle tracking by varying a distribution of yaw momentum between a roll angle $\phi_i$ and a yaw momentum in the wheels $h_z$. Distribution of yaw momentum is controlled by varying a speed of a momentum wheel through the yaw momentum command $h_{zc}$; and 3. To provide for a pitch angle tracking $\theta_i$ by varying a pitch momentum of a spacecraft. Pitch momentum is controlled by varying a speed of a momentum wheel through a pitch momentum command $h_{yc}$.

FIG. 1 illustrates an environment for a spacecraft 10 in an inclined orbit 25 about Earth 20 at an ascending node 22. An equatorial plane 21 and an orbit plane 23 are skewed along a line of nodes 28 by an inclination i. An orbiting reference frame x-y-z is established for the spacecraft 10 orbit normal 11 having a roll axis x pointing along a direction of motion, a pitch axis y perpendicular to the orbital plane 23, and a yaw axis z pointing towards the center of the Earth 20. Roll, pitch and yaw angles are measured relative to this reference frame x-y-z using standard roll-pitch-yaw Euler rotations.

The spacecraft 10 rotates about a negative pitch axis −y once per day with rotation rate $\omega_0$. Momentum wheels (not shown) onboard the spacecraft 10 provide a momentum bias $H_n$, also along the negative pitch axis −y.

Attitude errors induced by the inclination i of the orbit 25 arise when the spacecraft 10 is not pointing as it would in a nominal equatorial orbit. There are two major sources of inclination attitude errors: reference frame misalignment and ground tracking errors. When an orbit is inclined, the orbiting reference frame x-y-z is no longer aligned with the equator. This relative misalignment of the orbiting reference frame results in a time-varying yaw angle $\psi_i$ between the inclined orbit reference frame x-y-z and an equatorial orbit reference frame. The yaw angle $\psi_i$ angle is maximum at the ascending node 22 and the descending node 24 and is zero at antinodes 29 located between the ascending node 22 and the descending node 24. FIG. 1 illustrates attitude of the spacecraft 10 at four positions around the orbit 25.

Ground tracking errors arise because the spacecraft 10 is not positioned in the equatorial plane 23, and the yaw axis line of sight or nominal pointing 11 does not intersect the Earth 20 at the equator 14. FIG. 2 illustrates a yaw axis pointing direction of spacecraft 10 at an antinode 29. The spacecraft 10 is above the equatorial plane 23 having nominal pointing 11 of its yaw axis intersecting the Earth 20 at a point above the equator 14 (nadir 16). The spacecraft 10 must be biased downward in roll to point at the same point 26 on the equator 24 at which it would have pointed had the spacecraft 10 been in an equatorial orbit. To compensate for pitch errors, the spacecraft must be biased in pitch at other points in the orbit. The ground track 27, or intersection of the yaw axis and the Earth 20 surface, is a figure eight which is traced out with pitch errors and roll errors as the spacecraft 10 proceeds around the orbit 25.

The width of the ground track 27 figure eight is also related to the inclination i of the orbit 25, and the spacecraft 10 must compensate for resulting pitch errors. What is needed is a method and an apparatus for compensating for such resulting errors which minimizes fuel expenditure and maintains a particular level of autonomy.

SUMMARY OF THE INVENTION

The present invention is a method and apparatus to control a pointing trajectory of an aim point with respect to one or more targets for a momentum bias spacecraft in an orbit inclined relative to an equatorial geosynchronous orbit. The spacecraft is provided with an onboard computer capable of using orbit information available to the spacecraft and spacecraft hardware to move the aim point according to a predetermined tracking model which may be either time-varying or invariant which permits precise pointing and simultaneously promotes greater spacecraft autonomy. The tracking model allows the controller to remove short-term nutational and long-term orbit rate dynamical disturbances, beyond simple-order sinusoidal functions having a single frequency.

The present invention offers advantages over the prior art. First, control over pitch error is provided. For particular applications, such as communication satellites having exceedingly tight pointing accuracy requirements to maximize a power of a transmitted beam at a receiving antenna, pointing inaccuracies of the order of 0.02 degrees which is typical of a 5 degree inclined orbit, are excessive. Second, the present invention compensates more accurately for inclination effects than simple "nodding" resulting from a sinusoidal roll command. Third, the present invention provides an apparatus to establish a desired pointing trajectory from a generalized function represented by, for example, Fourier coefficients, splines, or table lookup. The desired pointing trajectory not only compensates for inclination effects, but it may also change a target point and cause the aim point to effectively point to the new target. This pointing trajectory may trace virtually any path on a face of the object 20 about which the spacecraft orbits to provide a time varying, or time independent, target.

Apparatus according to one embodiment of the present invention comprises a full state estimator, a feedback circuit, an integral controller, model-following logic, model-generation means, and momentum thruster unload logic for long-term momentum management. A particular spacecraft may be configured similarly to existing two-dimensional momentum controlled (i.e., a V-wheel system), momentum bias spacecraft. Each spacecraft must have a suitable actuator to control the momentum bias system, some type of momentum unload control, a sensor to provide indication of roll errors and pitch errors and a device to measure wheel yaw momentum. The spacecraft attitude controller is initiated by first erecting a net momentum vector perpendicular to the equatorial plane.

The full state estimator operates upon the roll error and wheel yaw momentum to generate estimates of roll, pitch, yaw, spacecraft roll momentum, spacecraft pitch momentum, spacecraft yaw momentum, wheel pitch momentum, wheel yaw momentum ("$h_z$"), and possibly solar torques. These estimates are provided to the full state plus integral controller which eliminates both nutational and orbit rate dynamical errors using momentum wheels and magnetic torquers.

The model-following logic minimizes tracking errors and allows the control system to regulate the roll, pitch, yaw and $h_z$ about their desired, nonzero trajectories. The model following logic provide a model of the desired response for roll, yaw, and $h_z$ and feedforward and feedback matrices.

The model is updated by model-generation means which is designed to make corrections to the model. Typically these are long-term corrections, and the model generation means is embodied in code which is provided onboard or uploaded to a computer on-board spacecraft. The momentum thruster unload logic provides for long term momentum management. If magnetic torquers are used, yaw unloads are only required for backup operation. The yaw unload logic uses the yaw momentum error as an input to determine whether to fire an unload. The yaw momentum error is $h_{zi}$ minus the actual yaw momentum. Pitch unloads fire when the pitch momentum exceeds a prespecified deadband. For typical environmental disturbances and thruster torques, three pitch unloads per day are anticipated.

The above-described embodiment of the present invention offers pointing accuracy comparable to a geosynchronous orbit, but at a tremendously significant savings in costs due to decreased propellant requirements for a particular given operational lifetime. A spacecraft embodying the above-described embodiment of the present invention does not require most of the propellant that is necessary for stationkeeping maneuvers. As a satellite has an expected lifetime of 10 years, eliminating a major proportion of the 200-300 kilograms of propellant necessary for equatorial stationkeeping maneuvering and replacing it with the 10-20 kilograms of propellant required for attitude control results in savings which can be readily and immediately appreciated.

One implementation calls for placement of a spacecraft initially in a positive 5 degree inclined orbit. Thereafter, the spacecraft is permitted to drift through the equatorial plane to negative degrees of inclination.

It is thereby possible to compensate for errors in roll, pitch and yaw due to orbit inclination through use of orbit information by an attitude controller and to thereby move an aim point of a spacecraft according to tracking model.

The invention will be better understood by reference to the following detailed description in connection with the accompanying drawings.

BRIEF DESCRIPTION OF THE DRAWINGS

FIG. 1 is a schematic diagram of the environment of a spacecraft at various positions in an inclined orbit about the earth;

FIG. 2 is a schematic diagram of a yaw axis pointing direction of a spacecraft in an inclined orbit at an antinode;

FIG. 3 is a block schematic diagram of a control system implementing a first embodiment of the present invention;

FIG. 4 is a block diagram of a roll/yaw control system shown in FIG. 3;

FIG. 5 is a schematic block diagram of a yaw control loop shown in FIG. 4;

FIG. 6 is a block diagram of a roll control loop shown in FIG. 4;

FIG. 7 is a block diagram of a pitch control shown in FIG. 3; and

FIG. 8 is a block diagram of a pitch control loop shown in FIG. 7.

DESCRIPTION OF SPECIFIC EMBODIMENTS

The present invention incorporates a plurality of control loops, as described in detail hereafter, which operate in accordance with preselected equations of motion for a momentum bias spacecraft in an inclined orbit. The derivation of these equations of motion embodied in the control loops was described previously. A specific implementation of these control loops by an onboard computer will be described next.

FIG. 3 is a block diagram showing a control system of one embodiment of the present invention. The illustrated embodiment utilizes hardware of a spacecraft 10 and an onboard computer 32. An earth sensor 30, for orbit about the earth, provides roll (R) and pitch (P) attitude measurements as electronic signals. A momentum wheel speed sensor 34 provides an electronic signal having a voltage proportional to a speed of each wheel of a momentum system (not shown). There are provided a plurality of speed signals, one speed signal for each wheel in operation. The analog electronic signals are converted to digital form and provided to the onboard computer 32. The onboard computer 32 performs a plurality of functions which include: time propagation of an attitude tracking model; conversion of momentum from wheel axes to spacecraft axes; conversion of momentum from spacecraft axes to wheel axes; roll/yaw control; and pitch control.

A yaw momentum tracking model 40, a roll angle tracking model 42 and a pitch angle tracking model 44 are used by the onboard computer 32 and facilitate generation of desired yaw momentum trajector $H_{zi}$, roll angle trajectory $\phi_i$ and pitch angle trajectory $\phi_i$ as a function of time. Parameters for use in the tracking models are provided in a vector $a$ and are updated periodically from a ground station (now shown) via conventional telemetry signals provided by a telemetry apparatus 46.

A generalized mathematical representation of the yaw momentum tracking model 40 is:

$$H_{zi} = -i(a,t)H_n \sin(\omega_0 t + \kappa(a,t)) + f_1(a,t), \tag{12}$$

where i, $\kappa$ and $f_1$ are functions which depend upon time t and parameters in the vector $a$ which may be updated from the ground.

A generalized mathematical representation of the roll angle tracking model 42 is:

$$\phi_i = -\phi_{max}(a,t) \sin(w_0 t + \kappa(a,t)) + f_2(a,t) \tag{13}$$

where $$\phi_{max} \approx \frac{\pi}{2} - i - \tan^{-1}\left[\frac{0.8483}{\tan(i)}\right] \tag{14}$$

and, along with $f_2$, is a function of time and the parameter vector $a$.

A generalized mathematical representation of the pitch angle tracking model 44 is:

$$\phi_i = \phi_{max}(a,t) \sin(2\omega_0 t + \kappa(a,t)) + f_3(a,t), \tag{15}$$

where $\phi_{max} \approx i^2/24$, and $f_3$ is a function of time and the parameter vector $a$.

The functions $f_1$, $f_2$, and $f_3$ are general functions which are mission specific, depending upon particular orbits and a pointing path. For highly-accurate pointing missions or large inclination orbits, a full nonlinear kinematic equation must be used. If the spacecraft 10 does not point at the equator, a bias pointing couples with these full nonlinear kinematics to produce a nonsinusoidal trajectory.

The aim point may move throughout a day. The aim point is adjusted to compensate for thermal distortions or minimize a distortion error of independently pointed spot beams. The three functions $f_1$, $f_2$ and $f_3$ are chosen accordingly.

Functions $i(a,t)$ and $\kappa(a,t)$ vary slowly over time. For missions which require, or are desired to have, a high degree of autonomy, inclination and location of an ascending node will change. The tracking models will be adjusted over time without ground commands by use of the computer 32. The exact nature of the functions of i and $\kappa$ depend upon spacecraft geometry and orbital parameters and are determined numerically for particular implementations in well-known fashion. The degree of autonomy this control system permits is limited only by a total number of commandable parameters in the parameter vector $a$ and upon an accuracy of any orbital analysis.

FIG. 3 includes a momentum measurement distribution matrix 50 and a momentum command distribution matrix 52 which convert wheel speed information to spacecraft momentum and momentum commands to wheel speed commands, respectively. The wheel speed commands are provided to a wheel momentum control circuit 54. Momentum is stored along a pitch axis and a yaw axis of the spacecraft. This requires at least two nonparallel momentum/reaction wheels in a pitch/yaw plane of a spacecraft. Included among acceptable wheel configurations are the L-wheel system and the V-wheel system described above.

A roll/yaw control circuit 60 is provided for receipt of the yaw momentum tracking model 40 and the roll angle tracking model 42 outputs, as well as the roll R and measured yaw momentum. The roll/yaw control circuit 60 is operable to control magnetic torquers 62 and thrusters 66 of the spacecraft to properly control the aim point. A pitch control circuit 70 is provided responsive to an output of the pitch angle tracking model 44, the pitch P, and the measured pitch momentum output from the momentum measurement distribution matrix. The pitch control circuit 70 is also operable to control the thrusters 64.

FIG. 4 is a schematic block diagram of the roll/yaw control circuit 60. A measured yaw momentum in the wheels $H_{\psi m}$, an output of a yaw momentum tracking model $H_{zi}$, an output of a roll angle tracking model $\phi_i$, and a roll R from the earth sensor 30 are input into the block diagram. The roll angle tracking model 42 output $\phi_i$, passes through a roll feedforward control block 80. In a preferred embodiment, this roll feedforward control block 80 is a constant which is equal to a negative $H_n$. An output of the roll feedforward control block 80 is added to the output of the yaw momentum tracking model $H_{zi}$. This sum is fed forward and added to an output of a roll control loop 82 and provided to the momentum command distribution matrix 52 to generate a wheel yaw momentum command. The sum is also subtracted from a measured yaw momentum and input to both a deadband 84 and a yaw control loop 86. The deadband 84 is a threshold which, when exceeded, provides a signal to a yaw thruster of thrusters 64 to fire. The roll control loop 82 has a roll error $R_e$ ($\phi_i - R$) input. Roll error $R_e$ is also provided as an input to the yaw control loop 86.

FIG. 5 is a block diagram of a specific embodiment of the yaw control loop 86 illustrated in FIG. 4. The yaw control loop 86 is described in detail in Lehner et al., incorporated herein by reference and is not discussed here in detail. The yaw control loop 86 has two inputs. A first input 87 is the roll error $R_e$. A second input 89 is the measured yaw momentum in the wheels less the summation of the output of the roll feedforward control and the output of the yaw momentum tracking model 40, $H_{zi}$. Outputs of the yaw control loop 86 are roll and yaw torque commands 91, 93 provided to the magnetic torquers 62, if provided.

FIG. 6 is a block diagram of a specific embodiment of the roll control loop 82 of FIG. 4 which includes gain elements TM, K and TZ 95, 97, 99 which are calculated from formulas given in the Terasaki publication "Dual Reaction Wheel Control With Spacecraft Pointing", Symposium and Attitude Stabilization and Control of Dual Spin Aircraft, August 1967, hereby expressly incorporated by reference for all purposes. There is a one stage negative feedback loop 101 and a negative feedforward loop 103. The output of the roll control loop 82 is fed to a summer 79 (FIG. 4) which is combined with the expression $H_{zi} - H_n$ to become a particular of the momentum command distribution matrix.

FIG. 7 is a block diagram of the pitch control circuit 70. An output of the pitch angle tracking model 44, $\theta_i$, the pitch angle P from the earth sensor 30 and the measured pitch momentum from the wheels as output by the momentum measurement distribution matrix 50 are fed as inputs to the pitch control circuit 30. An angle $\theta_i$ is provided as an input to a pitch feedforward control circuit 90. The pitch angle P from the earth sensor 30 is subtracted from $\theta_i$ and input to a pitch control loop circuit 90. In a specific embodiment, pitch feedforward control 90 is not implemented.

A pitch error signal $P_e$ equal to $\theta_i$ minus the pitch angle P from the earth sensor 30 is fed into the pitch control loop circuit 92. One embodiment of the pitch control loop 92 is shown in FIG. 8. Gains $K_\theta$ and $K_\omega$ are chosen to place eigenvalues of an optimal estimator 100. A controller 102 has gains $C_\theta$ and $C_\omega$ which are calculated to place poles of the pitch dynamics. Control system design techniques of this type are standard. The output 105 of the controller 102 is fed through a wheel control compensation 104, added to an output of the pitch feedforward control 90 and sent as a pitch momentum command to the momentum command distribution matrix 52. A deadband 94 fires a pitch thruster of thrusters 64 when the pitch momentum in the wheels exceeds a preselected threshold. The thrusters provide the torque to point the spacecraft 10.

The invention has now been explained with reference to a specific embodiment. Other embodiments will be apparent to those of ordinary skill in the art. It is therefore not intended that the invention be limited except as indicated by the appended claims.

What is claimed is:

1. In a method for controlling pointing, relative to a nadir, of a momentum-bias spacecraft in a near-circular orbit defining a plane that is inclined relative to an equatorial plane containing a geosynchronous orbit using momentum wheel controllers disposed in a V and capable of controlling momentum in only a pitch-yaw plane of said satellite, said spacecraft having a roll axis, a pitch axis and a yaw axis, wherein the momentum of said satellite is defined by a momentum vector, and wherein inclination inherently causes roll, pitch and yaw errors with respect to a desired target as a function of time, in order to permit relaxation of control of inclination, said method comprising the steps of:

erecting a momentum vector in said spacecraft which is perpendicular to the equatorial plane; and supplying time-varying roll commands and yaw momentum commands for said satellite; and controlling attitude of said satellite as a function of said roll commands and yaw momentum commands;

the improvement comprising:

generating a desired pointing trajectory to said desired target as a function of time;

converting said pointing trajectory to time-varying roll commands, pitch commands and yaw momentum commands for said satellite; and controlling attitude of said satellite as a function of said pitch commands for tracking said desired target trajectory.

2. The method of claim 1 further including the step of subtracting the yaw momentum command from yaw momentum of said satellite to produce a difference and dumping as excess momentum the difference in order to prevent undesired unloading of yaw momentum used to control inclination effects.

3. In a satellite attitude control, the apparatus comprising:
- a first and a second sensor to passively determine alignment errors for a first and a second axis of the satellite;
- a momentum biasing attitude control apparatus for effecting attitude control in response to roll commands, pitch commands, and yaw momentum commands;
- a model generating circuit for receiving a generalized attitude definition for the spacecraft;
- a modelling circuit, coupled to said model generating circuit, for receipt of said generated model and determination of appropriate roll commands, pitch commands, and yaw momentum commands to established a particular aim point for a selected target;
- a short term tracker circuit, coupled to said modelling circuit, said first and second sensors, and said attitude control apparatus, for receipt of said commands and to provide attitude control information in response to said commands appropriate to position the spacecraft at said commanded position to provide tracking and damping of nutational dynamics; and
- a long term tracker to observe long term orbit rate dynamics.

4. An apparatus for providing tracking control of a V-wheel system momentum-bias spacecraft having a measured roll error and a yaw momentum in an inclined orbit, wherein the momentum of the V-wheel system is controlled by actuators and magnetic torquers, comprising:
- a full-state estimator, for receipt of the measured roll error and yaw momentum, to generate estimates of one or more of the following: roll, pitch, yaw, roll momentum, pitch momentum, yaw momentum, wheel pitch momentum, wheel yaw momentum ($h_z$), and solar torques;
- a full-state feedback plus integral controller, coupled to said full-state estimator and the actuators, for eliminating both nutational and orbit rate dynamical errors;
- model following logic, coupled to said full-state feedback plus integral controller, to provide a model of the desired response for roll, yaw, and $h_z$, feedforward and feedback matrices allowing said controller to regulate the roll, pitch, yaw, and $h_z$ about their desired nonzero trajectories;
- model generation code, coupled to said model following logic, for updating said model and making long term corrections; and
- yaw and pitch momentum thruster unload logic, coupled to said actuators and said controller, for providing long term momentum control by use of the yaw momentum error and pitch momentum.

5. A method for providing attitude control for a V-wheel system momentum bias spacecraft in an obit inclined relative to an equatorial geosynchronous orbit, said spacecraft having a measured roll error and a yaw momentum, wherein momentum of the spacecraft is controlled by actuators coupled to the V-wheel system and magnetic torquers and a total net momentum of said spacecraft is initially established perpendicular to the equatorial orbit, comprising the steps of:
- estimating roll, pitch, yaw, roll momentum, pitch momentum, yaw momentum, wheel pitch momentum, wheel yaw momentum ($h_z$), and solar torques based on the measured roll error and yaw momentum;
- eliminating nutational and orbit rate dynamical errors by use of a full-state feedback plus integral controller coupled to the actuators;
- supplying said controller with a model of a desired response for roll, yaw, and $h_z$, and feedforward and feedback matrices;
- regulating the roll, pitch, and yaw, and $h_z$ about their desired nonzero trajectories by use of said model and said matrices;
- updating said model to make long term corrections to said model by use of a model generation code; and
- controlling yaw and pitch momentum by use of the yaw momentum error and pitch momentum through said controller and a yaw and pitch momentum thruster unload logic.

* * * * *

UNITED STATES PATENT AND TRADEMARK OFFICE
CERTIFICATE OF CORRECTION

PATENT NO. : 5,100,084
DATED : Mar. 31, 1992
INVENTOR(S) : Rahn et al.

It is certified that error appears in the above-identified patent and that said Letters Patent is hereby corrected as shown below:

In column 3, line 23, delete "$-3\omega o^2$" and substitute therefor, --$3\omega_0^2$--;

In column 3, line 37, delete "system $H_n>0$" and substitute therefor, --system; $H_n>0$--;

In column 4, line 9, delete "nodes $H_{zi}$" and substitute therefor, --nodes, $H_{zi}$--;

In column 4, line 45, delete "spacecraft $H_{zi}$" and substitute therefor, --spacecraft, $H_{zi}$--"

In column 8, line 7, delete "$\phi_i$" and substitute therefor, --$\theta_i$--; (second occurence)

In column 8, line 37, delete "$\phi_i = \phi_i$" and substitute therefor, --$\theta_i = \theta$ --;

In column 8, line 39, delete "$\phi_{max}$" and substitute therefor, --$\theta_{max}$--.

Signed and Sealed this

Twentieth Day of July, 1993

Attest:

MICHAEL K. KIRK

*Attesting Officer*  *Acting Commissioner of Patents and Trademarks*